(12) United States Patent
Nakamura et al.

(10) Patent No.: US 7,328,692 B2
(45) Date of Patent: Feb. 12, 2008

(54) INTAKE DEVICE FOR INTERNAL COMBUSTION ENGINE

(75) Inventors: Katsuyuki Nakamura, Yokohama (JP); Shigekazu Fuji, Yokohama (JP); Isao Yasuma, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/960,502

(22) Filed: Oct. 8, 2004

(65) Prior Publication Data

US 2005/0076892 A1  Apr. 14, 2005

(30) Foreign Application Priority Data

Oct. 10, 2003  (JP)  ............................. 2003-351582

(51) Int. Cl.
  *F02F 47/10*  (2006.01)
(52) U.S. Cl. ................................. 123/572; 123/184.21
(58) Field of Classification Search ........ 123/572–574, 123/184.21–184.61, 568.11–56
  See application file for complete search history.

(56) References Cited

U.S. PATENT DOCUMENTS

| | | | | |
|---|---|---|---|---|
| 3,742,923 A | * | 7/1973 | Oblander et al. ........... | 123/572 |
| 4,068,628 A | * | 1/1978 | Duckworth ................. | 123/58.8 |
| 4,768,493 A | * | 9/1988 | Ohtaka et al. .............. | 123/573 |
| 5,209,191 A | * | 5/1993 | Kopec ..................... | 123/184.45 |
| 5,329,913 A | * | 7/1994 | Suzuki et al. .............. | 123/573 |
| 6,192,848 B1 | * | 2/2001 | Hada et al. ............. | 123/184.24 |
| 6,422,221 B2 | * | 7/2002 | Pietrowski et al. .... | 123/568.17 |
| 6,431,157 B1 | * | 8/2002 | Marcil ..................... | 123/568.11 |
| 6,553,978 B2 | * | 4/2003 | Takashiba .............. | 123/568.15 |
| 6,601,572 B2 | * | 8/2003 | Okamoto .................... | 123/572 |
| 6,604,506 B2 | * | 8/2003 | Tanaka et al. ............. | 123/336 |
| 6,772,744 B2 | * | 8/2004 | Nanno et al. ............... | 123/572 |
| 6,895,948 B2 | * | 5/2005 | Mori et al. ............ | 123/568.17 |

FOREIGN PATENT DOCUMENTS

| | | |
|---|---|---|
| JP | 57-136853 U | 8/1982 |
| JP | 7-103082 A | 4/1995 |
| JP | 8-246837 A | 9/1996 |
| JP | 10-61510 | 3/1998 |
| JP | 2001-123901 A | 5/2001 |
| JP | 2001-241367 A | 9/2001 |
| JP | 2002-106429 A | 4/2002 |
| JP | 2004-138023 | * 10/2002 |
| JP | 2003-120244 A | 4/2003 |
| JP | 2003-239816 A | 8/2003 |

* cited by examiner

*Primary Examiner*—Marguerite McMahon
(74) *Attorney, Agent, or Firm*—Foley & Lardner LLP

(57) ABSTRACT

According to one aspect of the invention, there is provided an intake device for an internal combustion engine, including a gas passage unit defining therein a secondary gas supply passage for supplying a secondary gas to an intake of the engine, and a thermal insulator disposed over at least one side of the gas passage unit so as to thermally insulate the secondary gas supply passage.

21 Claims, 8 Drawing Sheets

INTAKE DEVICE FOR INTERNAL COMBUSTION ENGINE

BACKGROUND OF THE INVENTION

The present invention relates to a device for introducing a secondary gas, including but not limited to blowby gas, EGR gas and/or secondary air, into the intake of an internal combustion engine, and more particularly to a technique for preventing the overcooling of the secondary gas.

Japanese Laid-Open Patent Publication No. 2001-123901 discloses an intake device for a vehicle internal combustion engine, having a gas supply passage for recirculating therethrough a secondary gas (e.g. as blowby gas, EGR gas or secondary air) to engine intake for exhaust gas purification or idle control.

SUMMARY OF THE INVENTION

It is desired in the above type of intake device that the secondary gas be prevented from becoming overcooled so as not to freeze even in cold engine conditions or in cold climate conditions. Especially when used in an in-line multi-cylinder internal combustion engine that is horizontally mounted in a vehicle with its intake situated toward a vehicle front side and its exhaust situated toward a vehicle rear side, the secondary gas supply passage lies on the engine intake side, i.e., the vehicle front side, so that the secondary gas tends to get overcooled under the influence of a driving wind blowing from the vehicle front side etc.

It is therefore an object of the present invention is to provide a device for introducing a secondary gas into the intake of an internal combustion engine while preventing the overcooling and freezing of the secondary gas effectively.

According to one aspect of the invention, there is provided an intake device for an internal combustion engine, comprising: a gas passage unit defining therein a secondary gas supply passage for supplying a secondary gas to an intake of the engine; and a thermal insulator disposed over at least one side of the gas passage unit so as to thermally insulate the secondary gas supply passage.

According to another aspect of the invention, there is provided an intake device for an internal combustion engine, comprising: secondary gas supply means for supplying therethrough a secondary gas to an intake of the engine; and insulating means for thermally insulating the secondary gas supply means.

The other objects and features of the invention will also become understood from the following description.

DESCRIPTION OF THE EMBODIMENTS

Figure 1:
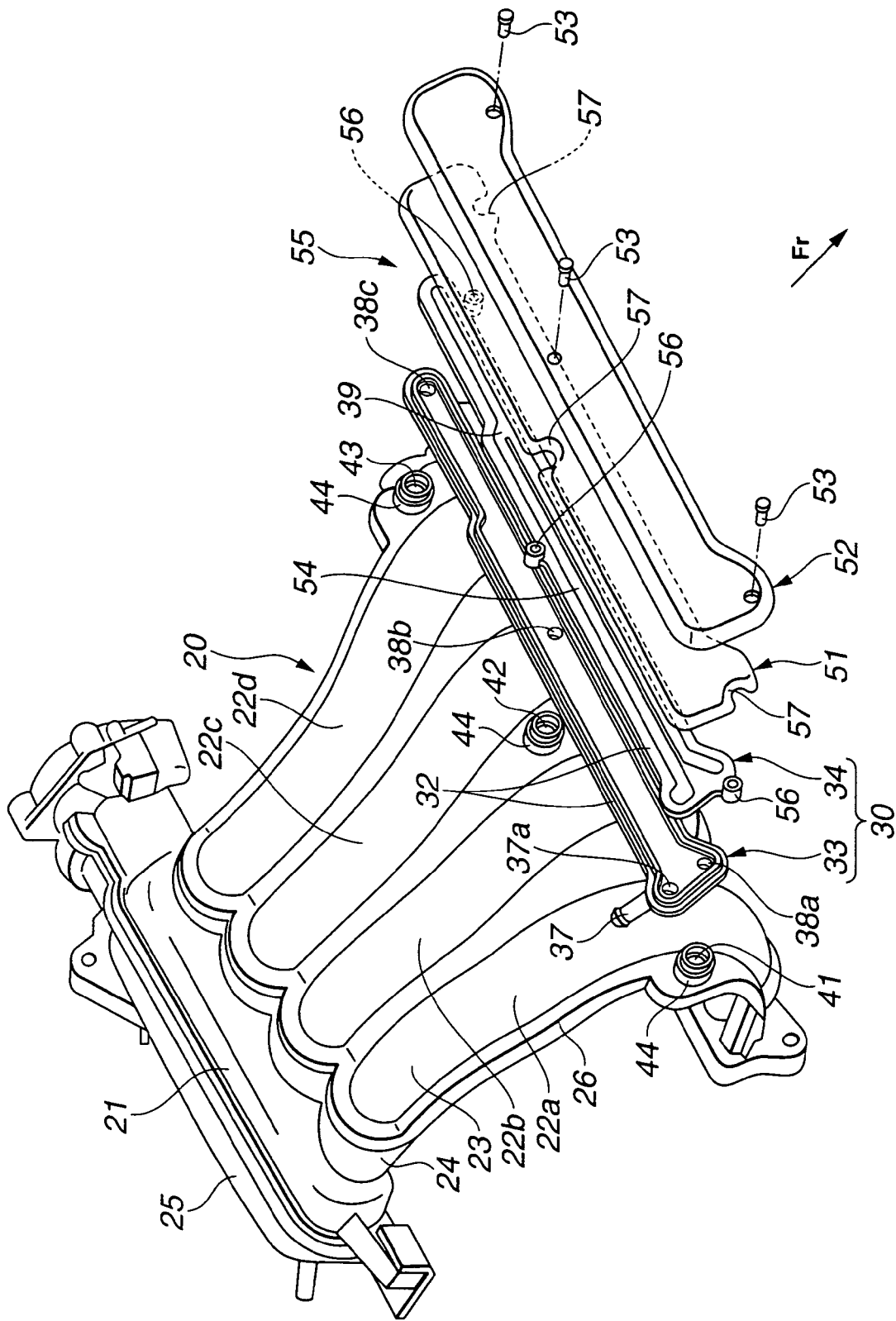
FIG. 1 is a partially exploded perspective view of an intake device for an internal combustion engine according to one exemplary embodiment of the present invention.

Internal combustion engine 10 in which the present invention is embodied will be described below in detail with reference to the drawings. In the following description, the terms "front", "rear", "left", "right" "upper", "lower", "inside" and "outside" are used relative to the normal orientation of a vehicle on which engine 10 is mounted, and the terms "upstream" and "downstream" are used relative to the direction of gas flow through engine 10.

For exemplary purposes, internal combustion engine 10 is herein designed as an in-line four-cylinder engine to be mounted horizontally in an engine room of the vehicle with its intake situated toward the front (indicated by an arrow Fr in FIG. 8) and its exhaust situated toward the rear. It is also assumed that a blowby gas recirculation apparatus is provided to recirculating blowby gas (i.e. leakage of gas compression past piston rings into an engine crankcase) to the intake of engine 10 via a known flow control valve (so-called "blowby control valve") for exhaust gas purification although not shown in the drawings.

Figure 7:
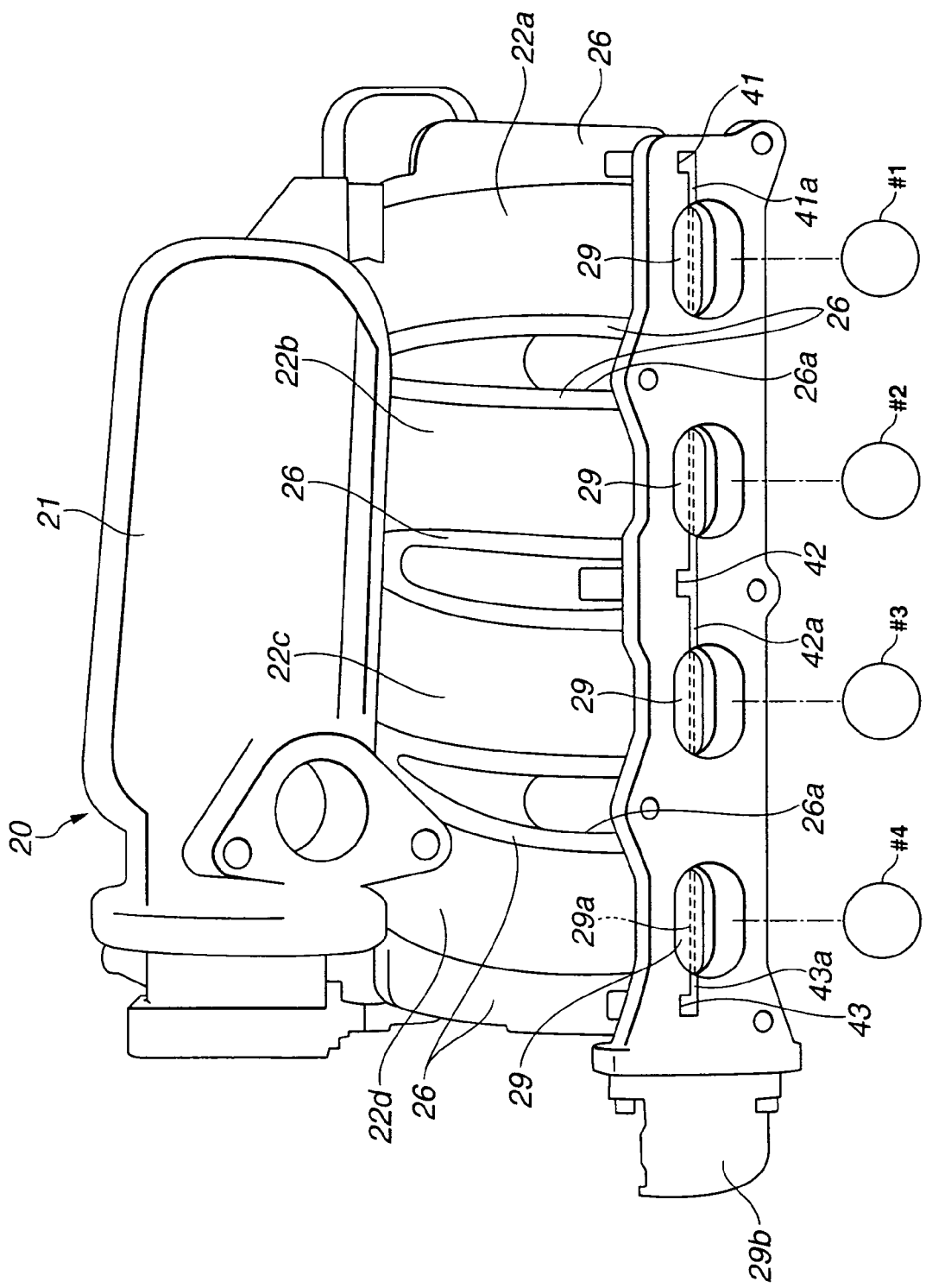
FIG. 7 is a vehicle rear side view of an intake manifold of the intake device of FIG. 2.
Figure 8:
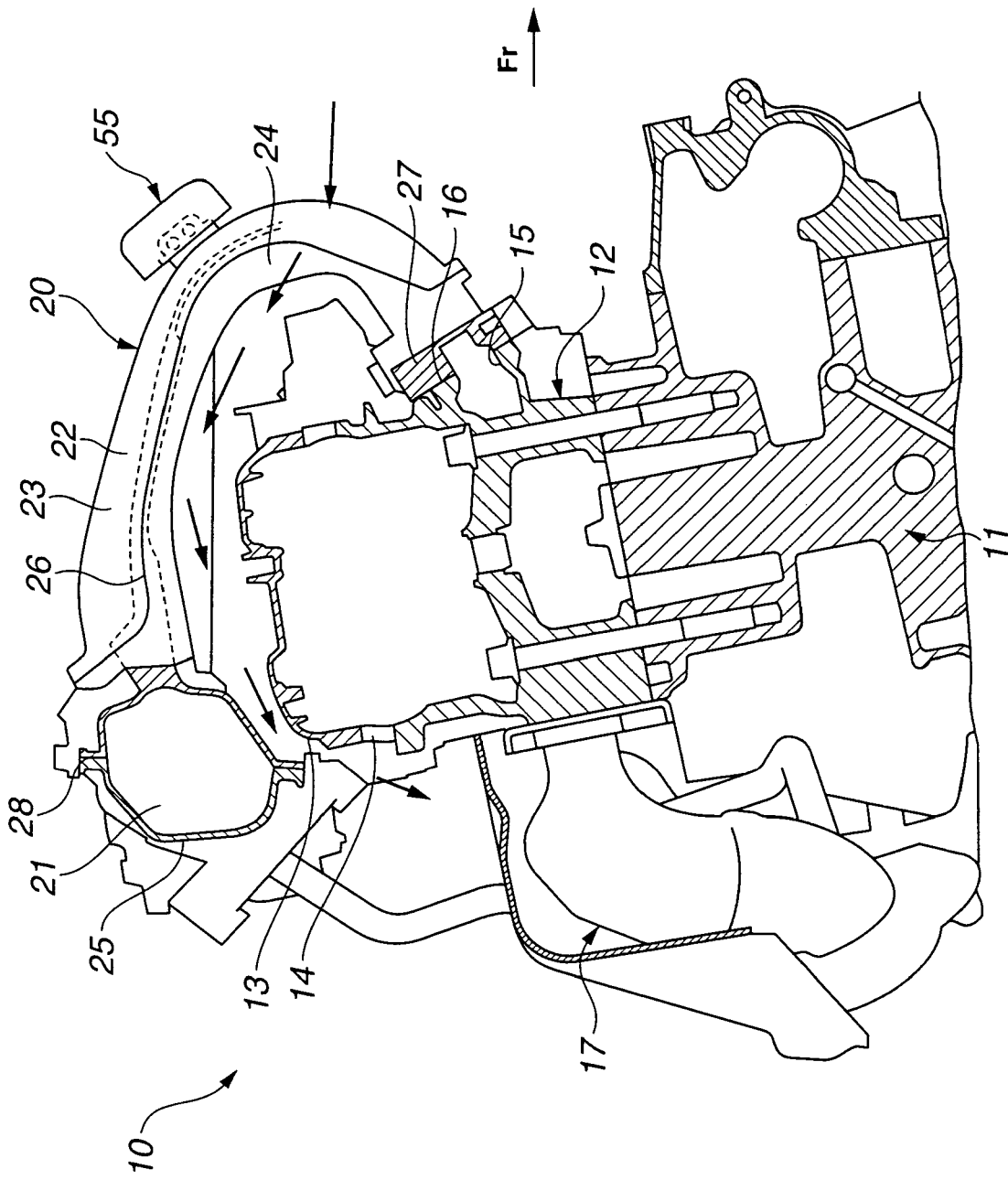
FIG. 8 is a sectional view of the internal combustion engine according to one exemplary embodiment of the present invention.

Referring to FIGS. 7 and 8, internal combustion engine 10 includes cylinder block 11, cylinder head 12, rocker arm cover 13, cam bracket 14, intake manifold 20, tumble control valves (TCV) 29 with valve shaft 29a and TCV actuator 29b, exhaust manifold 17, gas passage unit 30, thermal insulator 51 and thermal insulation cover 52.

Cylinder block 11 and cylinder head 12 are fastened to each other so as to define a row of four engine cylinders #1 to #4 (numbered from right to left). Rocker arm cover 13 is attached to an upper side of cylinder head 12 with cam bracket 14 held between cylinder head 12 and rocker arm cover 13. Four intake ports 15 are formed in a front side of cylinder head 12 and opened in a row at manifold seat 16 so as to communicate with the combustion chambers of engine cylinders #1 to #4, respectively. Intake manifold 20 is provided with flange 27 and is fixed to the front side of cylinder head 12 upon mating of flange 27 with manifold seat 16. Exhaust manifold 17 is fixed to the rear side of cylinder head 12 in which exhaust ports (not shown) are formed.

Intake manifold 20 has intake collector 21 at an upstream end thereof and first to fourth intake branches 22a to 22d branching off from intake collector 21 to connect intake collector 21 with intake ports 15, respectively, as shown in FIGS. 1 and 7. Intake collector 21 lies on a substantially upper side of rocker arm cover 13, and first to fourth intake branches 22a to 22d extend from intake collector 21 to intake ports 15 in a curve so as to cover an upper front side of engine 10.

As shown in FIGS. 1 and 8, intake manifold 20 is formed of three structural parts, i.e., first, second and third manifold parts 23, 24 and 25 made of a low-priced lightweight resinous material in the present embodiment. First and second manifold parts 23 and 24 are arranged on outer and inner sides of engine 10 and joined together at flanged mating portions 26 thereof to form intake branches 22a to 22d along mating portions 26. Third manifold part 25 is arranged on an upstream end of second manifold part 24, and second and third manifold parts 24 and 25 are joined together at mating portions 28 thereof to form intake collector 21 along mating portions 28. Manifold flange 27 is formed on a downstream end of second manifold part 24 in the present embodiment.

Primary intake passages are formed through intake branches 22a to 22d, respectively, so as to communicate with intake ports 15 for the introduction of air and fuel to engine cylinders #1 to #4. TCV 29 are disposed in intake branches 22a to 22d and driven by TCV actuator 29b through common valve shaft 29a in such a manner as to e.g. partly close the primary intake passages and thereby control a tumble flow of intake gas for improvement in combustion stability. Although not shown in the drawings, engine intake ports 15, located on a downstream side of TCV 29, have partition walls to divide the insides of intake ports 15 into portions shielded and not shielded by TCV 29.

Figure 6:
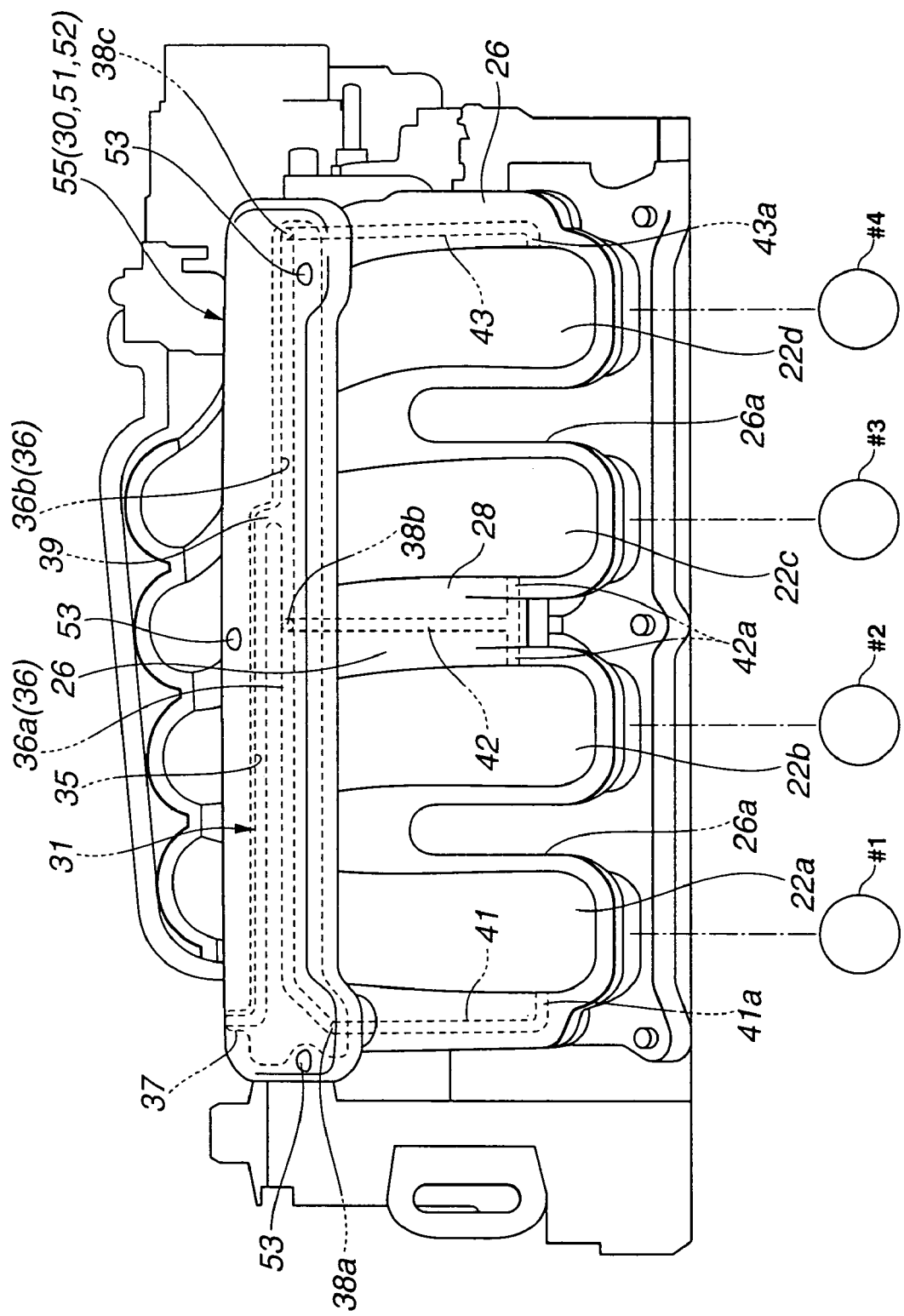
FIG. 6 is a vehicle front side view of the intake device of FIG. 1.

Also, secondary intake passages 41, 42 and 43 are formed through manifold mating portions 26 for the introduction of blowby gas (as a secondary gas) into the primary intake passages. As shown in FIGS. 1 and 6, secondary intake passages 41, 42 and 43 have gas inlets opened at three manifold boss portions 44 and gas outlets 41a, 42a and 43a opened at the primary intake passages of intake branches 22a to 22d. Secondary intake passages 41 and 43 communicate with the primary intake passages of first and fourth intake branches 22a and 22d via gas outlets 41a and 43a, respectively. On the other hand, secondary intake passage 42, formed between secondary intake passages 41 and 43, is branched to communicate with the primary intake passages of second and third intake branches 22b and 22c via gas outlets 42a. In order to prevent TCV 29 from becoming fouled and adhered due to the blowby gas, gas outlets 41a, 42a and 43a are formed at positions downstream of TCV 29 (i.e. in the combustion chamber side) as shown in FIG. 7. Alternatively, secondary intake passages 41, 42 and 43 may have gas outlets 41a, 42a and 43a opened at intake ports 15.

In the present embodiment, mating portions 26 of first manifold part 23 has recesses preformed to define secondary intake passages 41, 42 and 43 upon mating of first and second manifold parts 23 and 24. Similarly, manifold flange 27 of second manifold part 24 has hollows preformed to define gas outlets 41a, 42a and 43a upon mating of manifold flange 27 with manifold seat 16 in the present embodiment. This allows easier molding of intake manifold 20 with secondary intake passages 41, 42 and 43.

As shown in FIG. 6, open edges 26a are formed in some portions of intake manifold 20 through which secondary intake passages 41, 42 and 43 do not pass, i.e., in mating portions 26 between first and second intake branches 22a and 22b and between third and fourth intake branches 22c and 22d in order to achieve weight reduction and allow a driving wind to the exhaust side.

Gas passage unit 30 is mounted on intake manifold 20 by means of manifold boss portions 44, and blowby gas supply passage 31 is formed in gas passage unit 30 so as to communicate with secondary intake passages 41, 42 and 43 for the supply of the blowby gas from the blowby gas recirculation apparatus into intake manifold 20.

Figure 4:
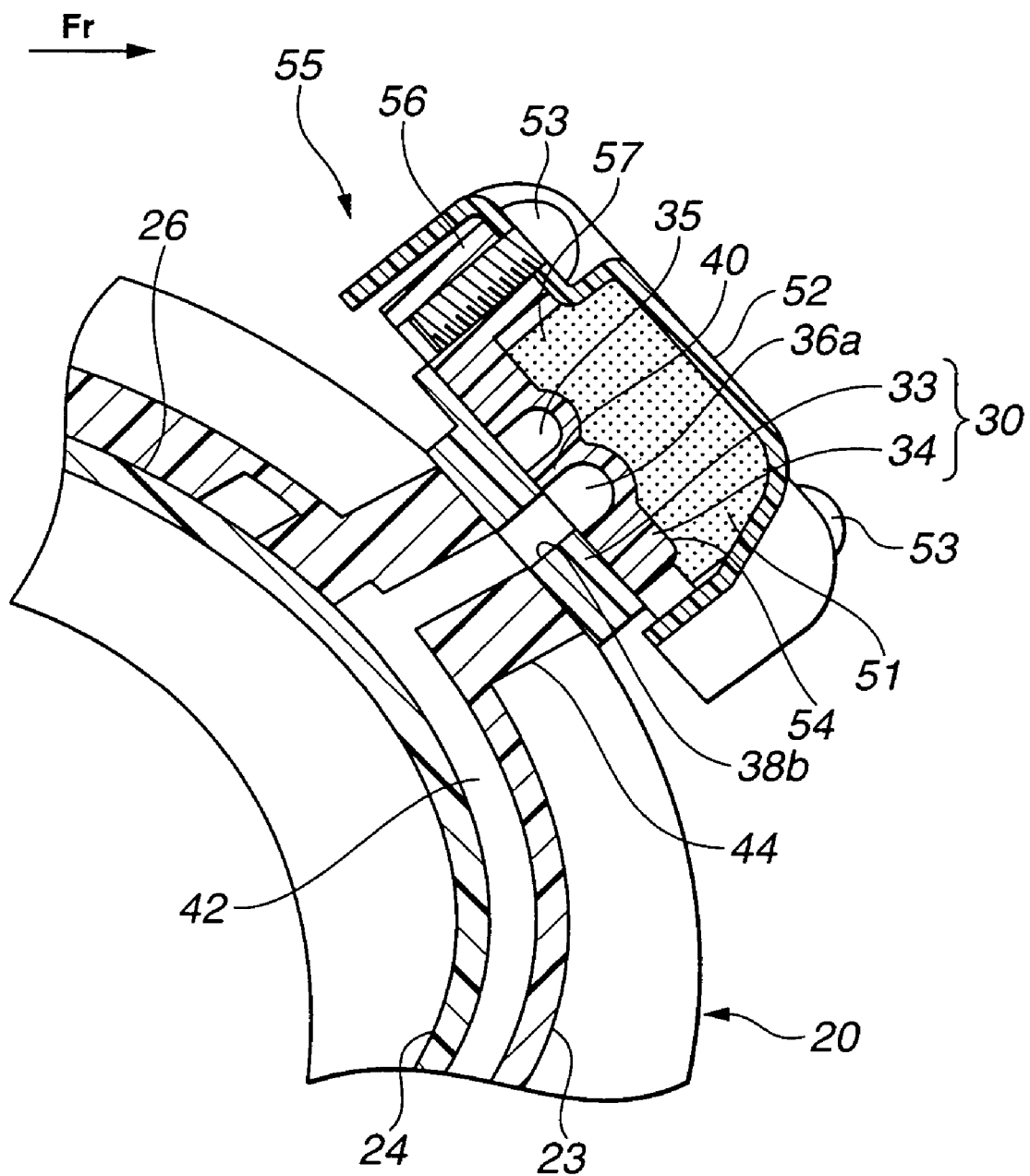
FIG. 4 is a sectional view of the intake device when taken along a line IV-IV of FIG. 2.
Figure 5:
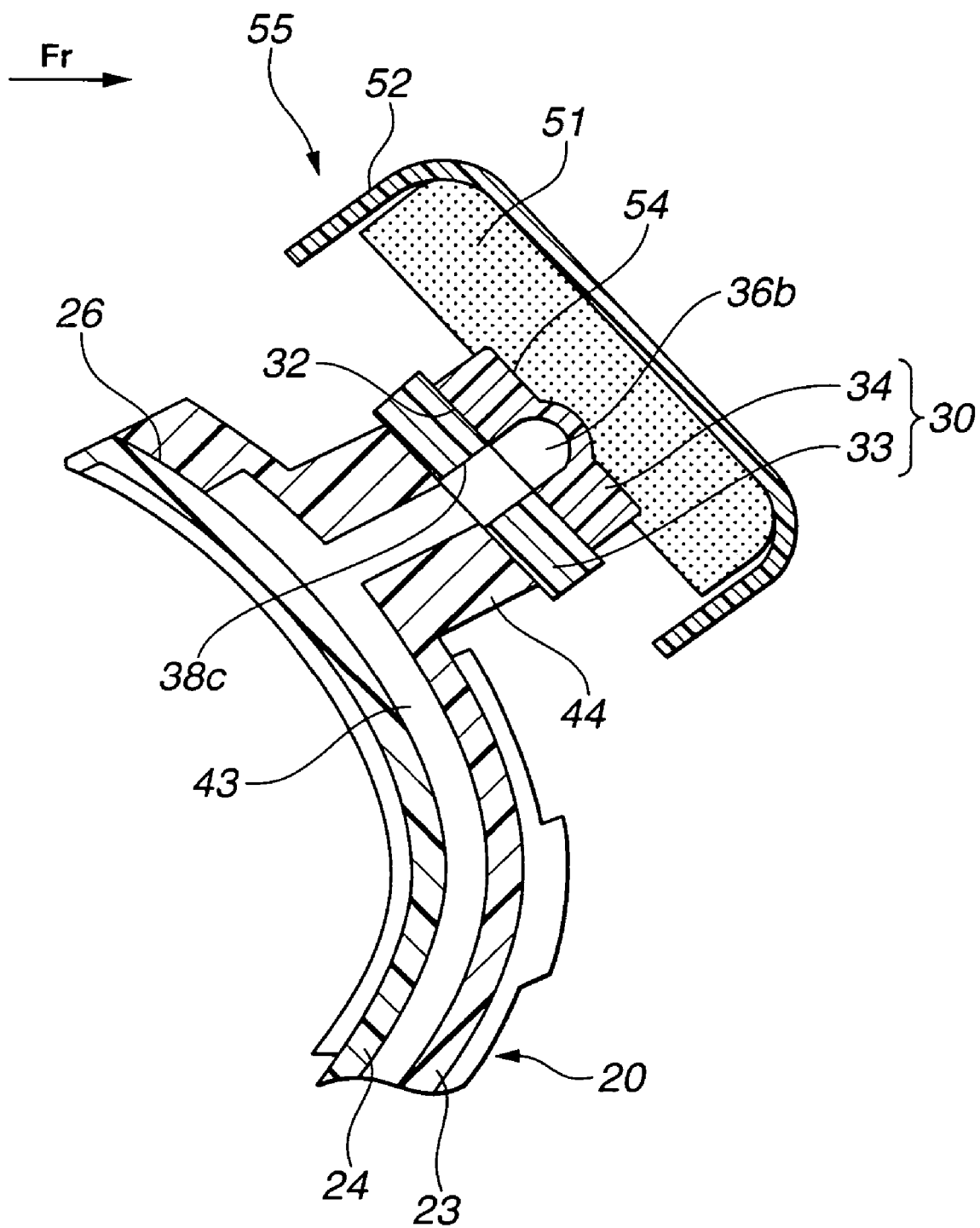
FIG. 5 is a sectional view of the intake device when taken along a line V-V of FIG. 2.

In the present embodiment, gas passage unit 30 has a substantially planular shape so as to cross over intake branches 22a to 22d (i.e. extend along the direction of the row of engine cylinder #1 to #4) as shown in FIG. 6. Further, gas passage unit 30 is formed of a pair of structural parts, i.e., first and second plate parts 33 and 34 made of a low-priced lightweight resinous material, as shown in FIGS. 1 and 4, in the present embodiment. First and second plate parts 33 and 34 are arranged on inner and outer sides of engine 10 and welded together at flanged mating edges thereof. First plate part 33 (located nearer to intake manifold 20) has gas introduction pipe 37 formed with pipe opening 37a at one end thereof adjacent to first intake branch 22a and connected to the blowby gas recirculation apparatus via a gas pipe (not shown). Second plate part 34 (located farther from intake manifold 20) has a recess preformed with swath-like partition wall 40 to define blowby gas supply passage 31 upon joining of first and second plate parts 33 and 34. This also allows easier molding of gas passage unit 30 with blowby gas supply passage 31.

Figure 2:
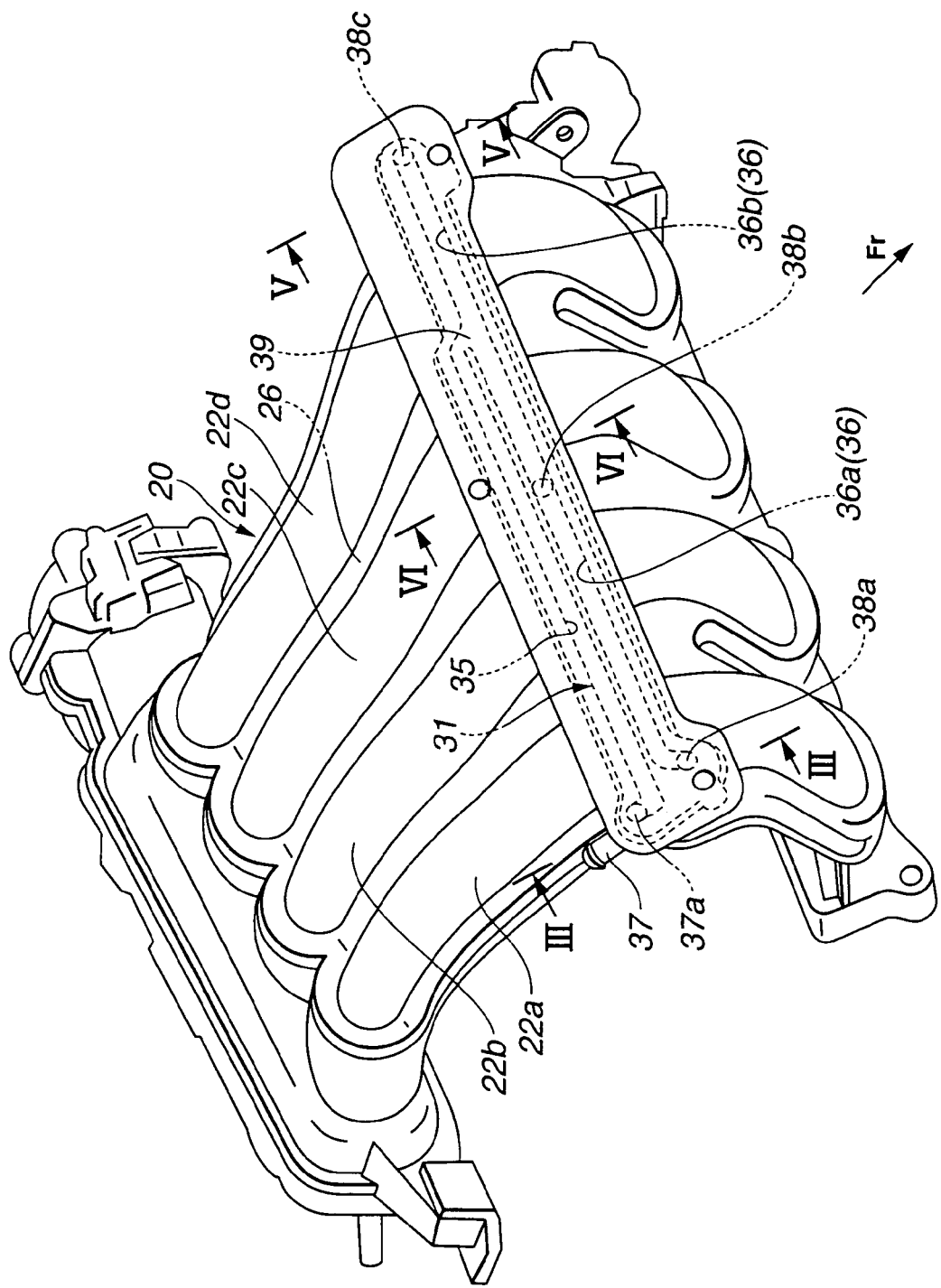
FIG. 2 is a perspective view of the intake device of FIG. 1.
Figure 3:
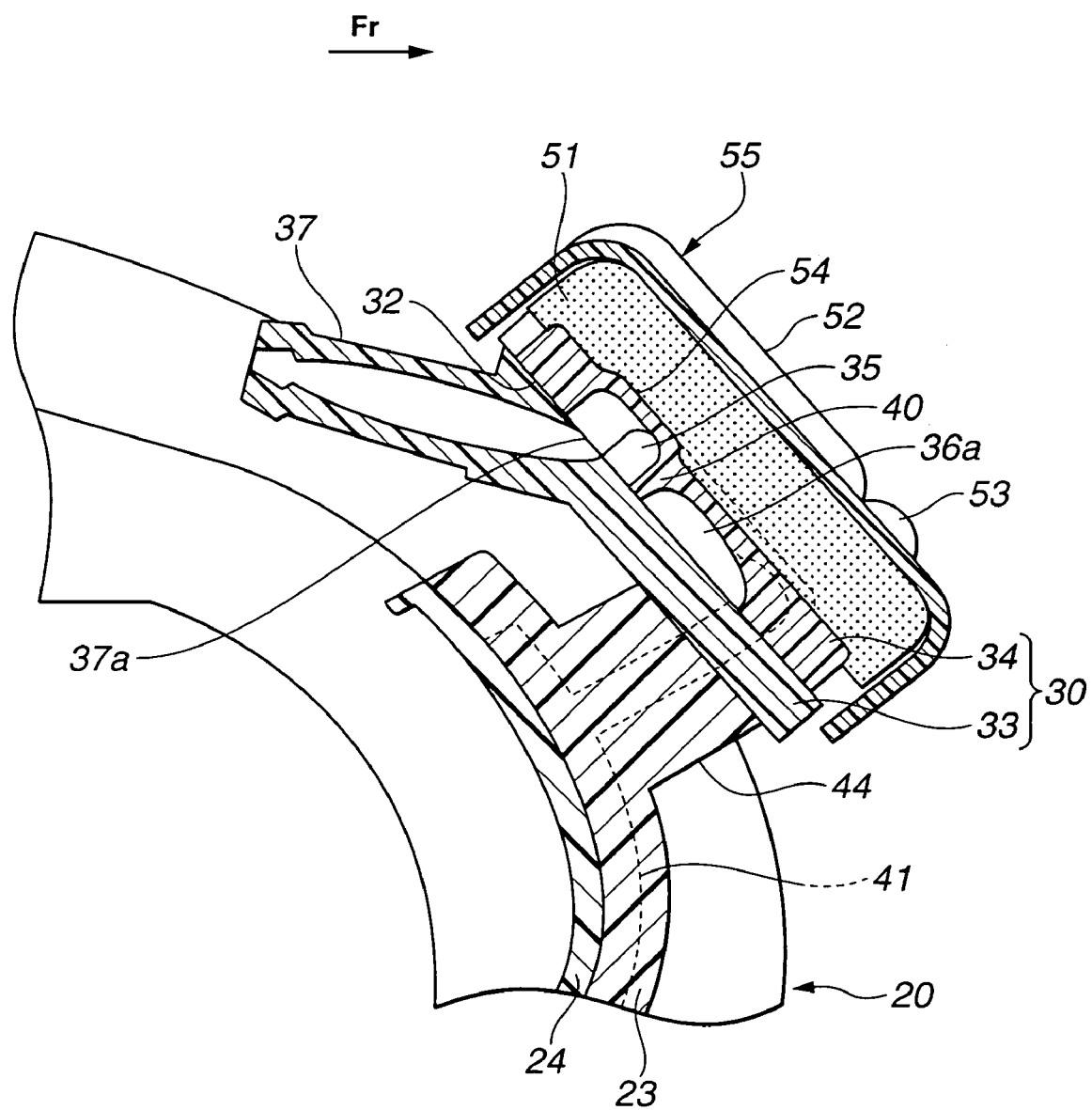
FIG. 3 is a sectional view of the intake device when taken along a line III-III of FIG 2.

As shown in FIGS. 2 and 6, blowby gas supply passage 31 includes main gas channel 35 at an upstream side thereof and branch gas channel 36 branching off from main gas channel 35 into two branch gas channel sections 36a and 36b. Main gas channel 35 communicates with gas introduction pipe 37 through pipe opening 37a and extends in a longitudinal direction of gas passage unit 30. Branch gas channel sections 36a and 36b extend into opposite directions from junction 39 between main gas channel 35 and branch gas channel 36 substantially in parallel with main gas channel 35. Further, branch gas channel section 36a is returned toward an upstream end of main gas channel 35 so that main gas channel 35 and branch gas channel section 36a extend adjacent to each other on both sides of partition wall 40 as shown in FIGS. 2 and 6. For the distribution of the blowby gas into secondary intake passages 41, 42 and 43, blowby gas supply passage 31 has gas supply openings 38a, 38b and 38c as shown in FIG. 6. Gas supply opening 38a is formed on branch gas channel section 36a at a position adjacent to first intake branch 22a (farther from second intake branch 22b) and connected with the gas inlet of secondary intake passage 41. Gas supply opening 38b is formed on branch gas channel section 36a at a position between second and third intake branches 22b and 22c and connected with the gas inlet of secondary intake passage 42. Gas supply opening 38c is formed on branch gas channel section 36b at a position adjacent to fourth intake branch 22d (farther from third intake branch 22c) and connected with the gas inlet of secondary intake passage 43.

Thermal insulator 51 is made of a material having high thermal insulating efficiency (heat shielding efficiency), such as a foamed material or sponge, and arranged on gas passage unit 30 so as to cover substantially the whole of outer front surface 54 of gas passage unit 30 and thereby prevent temperature decreases in the blowby gas flowing through blowby gas supply passage 31 even under the influence of e.g. a driving wind blowing from the vehicle front side.

Thermal insulation cover 52 is made of a resinous material, and fixed to gas passage unit 30 by three bolts 53 (or any other fixing means, such as rivets) with thermal insulator 51 held between gas passage unit 30 and thermal insulation cover 52 under compression, thereby securing thermal insulator 51 to gas passage unit 30 while further preventing temperature decreases in the blowby gas flowing through blowby gas supply passage 31. As shown in FIGS. 1 and 4, second plate part 34 of gas passage unit 30 is integrally formed with three bosses 56 in which bolts 53 are screwed, whereas thermal insulator 51 are formed with three recesses 57 so as to avoid interference with bosses 56.

These gas passage unit 30, thermal insulator 51 and thermal insulation cover 52 can be easily mounted by laminating them into compact subassembly 55 and then fixing subassembly 55 onto intake manifold 20.

As described above, internal combustion engine 10 is mounted on the vehicle with intake manifold 20 situtated toward the front and gas passage unit 30 fixed to the front side of intake manifold 20. In other words, gas passage unit 30 is located on the downstream side of intake manifold 20 overhanging toward the front. If front outer surface 54 of gas passage unit 30 is uncovered, gas passage unit 30 becomes directly exposed to the vehicle driving wind to thereby cause temperature decreases in blowby gas supply passage 31. In the present embodiment, however, front outer surface 54 of gas passage unit 30 is thermally protected by thermal insulator 51 and thermal insulation cover 52. It is therefore possible to prevent excessive temperature decreases in the blowby gas flowing though blowby gas supply passage 31 and avoid the overcooling and freezing of the blowby gas in blowby gas supply passage 31 effectively and assuredly. It has been proved by actual vehicle experiment that the temperature of the blowby gas in blowby gas supply passage 31 can be kept about 5° C. higher with the application of thermal insulator 51 onto gas passage unit 30 than that without thermal insulator 51.

The temperature of the blowby gas is more likely to get decreased in branch gas channel section 36a, notably a most downstream part of branch gas channel section 36a near first intake branch 22a where the amount of flow of the blowby gas is small and the distance passed through by the blowby gas is large. In the present embodiment, branch gas channel section 36a is adjacent to main gas channel 35 where the blowby gas temperature is relatively high. Heat is thus conducted from main gas channel 35 to branch gas channel section 36a through partition wall 40 so as to limit temperature decreases in branch gas channel sections 36a. In addition, the junction 39 of main gas channel 35 and branch gas channel 36 is formed at a position between gas supply openings 38b and 38c farther from gas introduction opening 37a, i.e., at a position near third intake branch 22c or between third and fourth intake branches 22c and 22d, in order to limit temperature decreases in the blowby gas while shortening blowby gas supply passage 31. It is thus possible to prevent the overcooling and freezing of the blowby gas in blowby gas supply passage 31 more effectively and assuredly.

The entire contents of Japanese Patent Application No. 2003-351582 (filed on Oct. 10, 2003) are herein incorporated by reference.

Although the present invention has been described with reference to a specific embodiment of the invention, the invention is not limited to the above-described embodiment. Various modification and variation of the embodiment described above will occur to those skilled in the art in light of the above teaching. For example, internal combustion engine 10 may alternatively be designed to reflux other secondary gas, such as EGR gas or secondary air, through gas supply passage 31. Intake manifold 20 may be made of another material, such as an aluminum alloy material. The number of cylinders is not particularly restricted, and engine 10 can alternatively be designed as e.g. an in-line six-cylinder engine. The scope of the invention is defined with reference to the following claims.

What is claimed is:

1. An intake device for an internal combustion engine, comprising:
    an intake manifold mounted on a vehicle front side of the engine;
    a gas passage unit formed separately from the intake manifold and mounted on a vehicle front side of the intake manifold, the gas passage unit including a pair of plate parts joined together, at least one of the plate parts having a recess formed to define a secondary gas supply passage for supplying a secondary gas to intake ports of the engine via the intake manifold; and
    a thermal insulator attached to the gas passage unit so as to cover a vehicle front side of the gas passage unit and thermally insulate the secondary gas supply passage.

2. An intake device according to claim 1, the secondary gas supply passage including a main gas channel at an upstream side thereof and a branch gas channel branching off from the main gas channel.

3. An intake device according to claim 2,
    the main gas channel extending in a longitudinal direction of the gas passage unit, and
    the branch gas channel having a section extending adjacently and substantially in parallel with the main gas channel toward an upstream end of the main gas channel.

4. An intake device according to claim 1, the thermal insulator being made of a foamed material.

5. An intake device according to claim 1, the intake manifold including a plurality of intake branches to define primary intake passages for introducing air and fuel into the intake ports of the engine, respectively, and
    further defining therein secondary intake passages for introducing the secondary gas from the secondary gas supply passage into the primary intake passages or intake ports.

6. An intake device according to claim 5, further comprising intake control valves disposed in the respective intake branches, and
    the secondary intake passages communicating with the primary intake passages at positions downstream of the intake control valves.

7. An intake device according to claim 1, the secondary gas being blowby gas.

8. An intake device according to claim 1, wherein the plate parts are welded together at flanged mating edges of the plate parts.

9. An intake device according to claim 1, further comprising:
    a thermal insulation cover fixed to the gas passage unit with the thermal insulator held between the gas passage unit and the thermal insulation cover.

10. An intake device according to claim 1,
    wherein the intake manifold includes a plurality of intake branches to define primary intake passages for introducing air and fuel into the intake ports of the engine, respectively, and to define secondary intake passages for introducing the secondary gas from secondary gas supply passages into the primary intake passages or intake ports;
    wherein the intake manifold has manifold parts joined together at mating portions thereof to form a primary intake passage along the mating portions; and
    wherein the secondary intake passages are formed by the mating portions.

11. An intake device for an internal combustion engine, comprising:
    an intake manifold;
    a gas passage unit formed separately from the intake manifold and mounted on the intake manifold, the gas passage unit including a pair of plate parts joined together, at least one of the plate parts having a recess formed to define a secondary gas supply passage for supplying a secondary gas to intake ports of the engine via the intake manifold;

a thermal insulator attached to the gas passage unit so as to thermally insulate the secondary gas supply passage; and a thermal insulation cover fixed to the gas passage unit with the thermal insulator held between the gas passage unit and the thermal insulation cover.

12. An intake device for an internal combustion engine, comprising:

an intake manifold;

a gas passage unit formed separately from the intake manifold and mounted on the intake manifold, the gas passage unit including a pair of plate parts joined together, at least one of the plate parts having a recess formed to define a secondary gas supply passage for supplying a secondary gas to intake ports of the engine via the intake manifold;

a thermal insulator attached to the gas passage unit so as to thermally insulate the secondary gas supply passage;

the intake manifold including a plurality of intake branches to define primary intake passages for introducing air and fuel into the intake ports of the engine, respectively, further defining therein secondary intake passages for introducing the secondary gas from the secondary gas supply passage into the primary intake passages or intake ports;

the intake manifold having manifold parts joined together at mating portions thereof to form the primary intake passages along the mating portions, and the secondary intake passages being formed through the mating portions.

13. An intake device for an internal combustion engine, comprising:

an intake manifold mounted on a vehicle front side of the engine;

secondary gas supply means for supplying a secondary gas to intake ports of the engine via the intake manifold; and insulating means for thermally insulating the secondary gas supply means, wherein the secondary gas supply means is mounted on a vehicle front side of the intake manifold and includes a pair of plate parts joined together, and at least one of the plate parts has a recess to define a secondary gas passage through which the secondary gas is supplied.

14. An intake device according to claim 13, wherein the secondary gas supply means is made of a resinous material.

15. An intake device according to claim 13, wherein the intake manifold has primary intake means for introducing air and fuel into the intake ports of the engine, mounting means for mounting the secondary gas supply means onto the intake manifold, and secondary intake means for introducing the secondary gas from the secondary gas supply means into the primary intake means or engine intake ports.

16. An intake device according to claim 15, wherein the intake manifold is made of a resinous material.

17. An intake device according to claim 13, wherein the plate parts are welded together at flanged mating edges of the plate parts.

18. An intake device for an internal combustion engine, comprising:

an intake manifold;

secondary gas supply means for supplying a secondary gas to intake ports of the engine via the intake manifold; and insulating means for thermally insulating the secondary gas supply means, wherein the secondary gas supply means is mounted on the intake manifold and includes a pair of plate parts joined together, and at least one of the plate parts has a recess to define a secondary gas passage through which the secondary gas is supplied;

wherein the secondary gas passage includes a main gas channel at an upstream side thereof and a branch gas channel branching off from the main gas channel into first and second branch gas channel sections in such a manner that the first and second branch gas channel sections extend in opposite directions substantially in parallel with the main gas channel.

19. An intake device according to claim 18, wherein the first branch gas channel section is adjacent to the main gas channel and longer than the second branch gas channel section.

20. An intake device for an internal combustion engine, comprising:

a gas passage unit defining therein a secondary gas supply passage for supplying a secondary gas to an intake of the engine; and a thermal insulator attached to the gas passage unit so as to thermally insulate the secondary gas supply passage;

wherein the engine is mounted on a vehicle with the intake of the engine situated toward a front of the vehicle;

wherein the gas passage unit is disposed on a vehicle front side of the engine intake;

wherein the thermal insulator is disposed at least on a vehicle front side of the gas passage unit;

wherein the secondary gas supply passage includes a main gas channel at an upstream side thereof and a branch gas channel branching off from the main gas channel;

wherein the main gas channel extends in a longitudinal direction of the gas passage unit;

wherein the branch gas channel includes a section extending adjacently and substantially in parallel with the main gas channel toward an upstream end of the main gas channel.

21. An intake device for an internal combustion engine, comprising:

an intake manifold mounted on a vehicle front side of the engine;

a gas passage unit formed separately from the intake manifold and mounted on a vehicle front side of the intake manifold, the gas passage unit defining therein a secondary gas supply passage for supplying a secondary gas to intake ports of the engine via the intake manifold; and a thermal insulator disposed over at least a vehicle front side of the gas passage unit so as to thermally insulate the secondary gas supply passage;

wherein the secondary gas is blowby gas.

* * * * *